United States Patent [19]

Jenkins et al.

[11] 4,419,966

[45] Dec. 13, 1983

[54] FLUIDIZED BED COMBUSTION

[75] Inventors: Francis J. Jenkins; Michael J. Jenkins, both of Wolverhampton, England

[73] Assignee: EMS Thermplant Limited, Birmingham, England

[21] Appl. No.: 351,370

[22] Filed: Feb. 23, 1982

[30] Foreign Application Priority Data

Feb. 27, 1981 [GB] United Kingdom ............... 8106243

[51] Int. Cl.³ .................................................. F22B 1/02
[52] U.S. Cl. ........................................ 122/4 D; 110/245
[58] Field of Search ................... 122/4 D; 110/245; 432/15, 58

[56] References Cited

U.S. PATENT DOCUMENTS

| | | | |
|---|---|---|---|
| 3,893,426 | 7/1975 | Bryers | 122/4 D |
| 3,910,235 | 10/1975 | Highley | 122/4 D |
| 3,912,002 | 10/1975 | Elliott | 122/4 D |
| 4,270,468 | 6/1981 | Robinson et al. | 122/4 D |
| 4,273,073 | 6/1981 | Robinson | 122/4 D |

FOREIGN PATENT DOCUMENTS 1412033 10/1975 United Kingdom.
1448196 9/1976 United Kingdom.
6307 5/1979 United Kingdom.

Primary Examiner—Henry C. Yuen
Attorney, Agent, or Firm—Stevens, Davis, Miller & Mosher

[57] ABSTRACT

A fluidized combustion bed is divided by a hollow baffle into two regions which are fluidized at respectively higher and lower fluidizing velocities. Exhaust gases and elutriated particles leaving the larger region pass into the freeboard and around the baffle, the particles being deposited after such passage into the smaller region and the gases flowing into the baffle for exhaust.

10 Claims, 1 Drawing Figure

U.S. Patent  Dec. 13, 1983  4,419,966
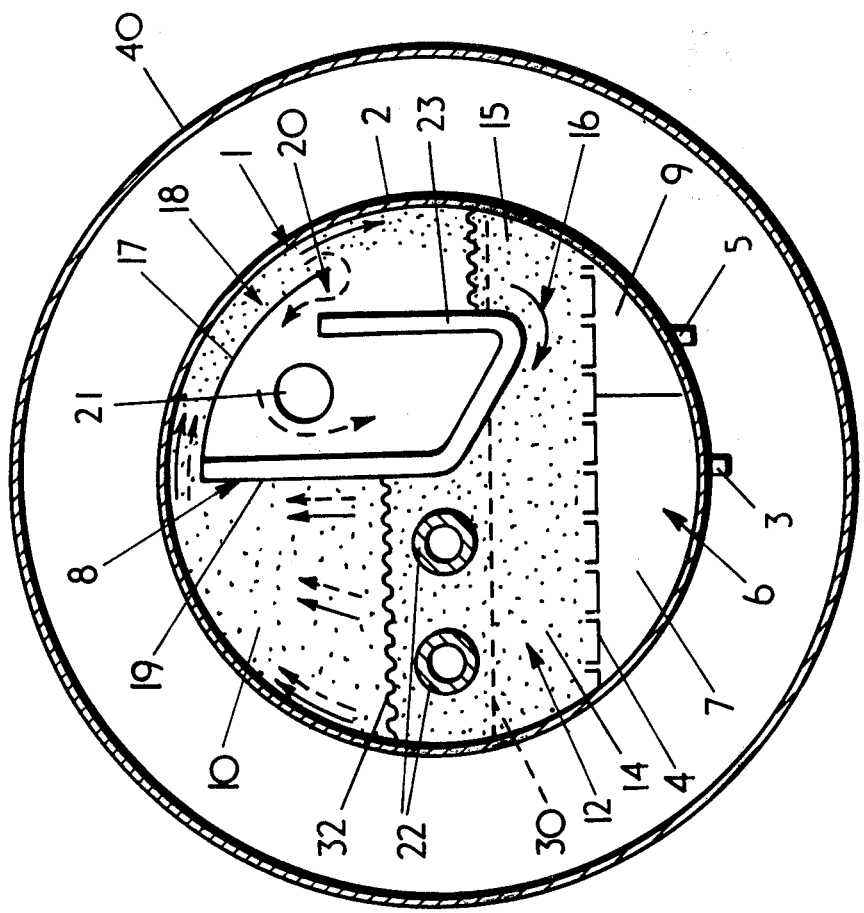

FLUIDIZED BED COMBUSTION

This invention concerns improvements in or relating to fluidised bed combustion.

In particular the present invention has reference to a fluidised bed combustor and a method of operation therefore suitable for use within a horizontal combustion chamber of a boiler wherein solid, liquid or gaseous fuel is to be burnt.

In fluidised bed combustion, air is passed upwardly through a bed of particulate material in order to fluidise the same and to provide combustion air for the fuel introduced to the bed for burning. The combustion gases leave the surface of the fluidised bed vertically. One of the problems attendant upon this mode of combustion is that of entrainment of bed particles in the gases. The height at which particles so entrained can disengage from these gases, sometimes referred to as 'transport disengagement height', can be considerable in order that the particles may reach their terminal velocity and fall back to the bed surface. While heights of the order required can be accommodated in vertical combustors, it is impractical to provide a horizontal combustor with the requisite dimension. The result of the horizontal flow component of the combustion gases as they pass to exhaust, at the end of the combustion chamber, is the loss of material from the bed. This material can be captured in separators downstream of the combustor and can be returned to the bed. Indeed when the bed material contains unburnt carbon it is essential to recycle the separated solids in order to attain the desired combustion efficiency and to maintain the correct bed level. The separation and recycling stages are expensive. However, in order to achieve the necessary economic level of operation it is necessary to fluidise the bed material at the velocities at which elutriation is concomitant. The alternative is to employ a combustion chamber of greater dimension than is conventional in horizontal shell boilers, thereby adding to the cost and rendering the operation uneconomic.

An object of the invention is thus to provide a fluidised bed combustor which seeks to overcome the problem of elutriation.

According to a first aspect of the invention there is provided a fluidised bed combustor including a horizontally elongate body for containing a fluidised bed of particulate material, a gas permeable support on which in use the bed is supported, a plenum defined between the support and the base of the body, the plenum being divided into at least two parts, an exhaust gas outlet at one end of the body, and a hollow elongate baffle extending within the body longitudinally thereof and communicating with the gas outlet, an inlet provided in the baffle, the baffle being disposed within the body such that in use at least a lower part thereof extends into the bed of particulate material thereby a define at least two regions therein corresponding to the at least two parts of the plenum.

The horizontally elongate body is preferably cylindrical in form and constitutes a combustion chamber or furnace tube capable of incorporation in a shell boiler.

The hollow elongate baffle may conveniently be provided with water cooling passages at least in its lower part. The relatively upper part of the baffle is advantageously spaced from the defining wall of the body thereby to provide a passage for the flow of gas and entrained particles from one side of the baffle to the other side thereof, the baffle dividing the freeboard into separate zones interconnected by the passage.

A heat exchanger may also be provided in the body for immersion within the expanded, fluidised bed.

According to a second aspect of the invention a method of operating the fluidised bed combustor of the first aspect includes the steps of establishing a bed of particulate material in at least two regions in a hollow elongate body, the regions being defined by a hollow elongate baffle extending into the bed and the freeboard thereabove, fluidising the regions of the bed at different rates, causing gases and entrained bed particles to pass in the freeboard from one region of the bed around the baffle to the other region thereof, the gases passing into the baffle for exhaust and the entrained bed particles being deposited in the other region of the bed fluidised at a relatively lower rate, and causing circulation of the bed material between the regions of the bed.

The fluidised bed is preferably divided into a relatively larger region and a relatively smaller region through which fluidising gas, e.g. air, is passed at a rate just sufficient to fluidise the material in that region. The rate of fluidisation in the relatively larger region in higher thereby in practice causing elutriation of bed particles which are constrained by the baffle to follow an initially upward path and thence to follow the contour of the body of the combustor at an upper part thereof. The gases and the particles pass over the baffle from the freeboard of the larger region of the bed and into the freeboard of the smaller region. Gases and particles tend to be separated as a result of the cyclonic effect induced by the relative disposition of the baffle and the wall of the combustor body, the gases passing into the baffle for exhaust and the particles being precipitated in the smaller region of the bed. The deposit of separated particles in the smaller region occasions an increase in pressure at the base of that region thereby promoting movement of circulation of bed material from one region to the other region of the fluidised bed. Unburnt solids entrained in gases leaving the more vigorously fluidised region of the fluidised bed are thus returned for complete combustion in the smaller region of the bed, or in the larger region thereof as a result of the circulation.

The separation of particles from the entraining gases prior to their egress from the combustor body substantially reduces the particle loading of the gases and therefore the need for comoplex gas cleaning equipment. Heat transfer in the combustor occurs through the wall or walls thereof and by virtue of water cooling passages in the baffle. Additional heat transfer can be achieved by locating a heat exchanger in the fluidised bed.

According to a third aspect of the invention there is provided a boiler incorporating a fluidised bed combustor of the first aspect operated in accordance with the second aspect.

By way of example only, one form of fluidised bed combustor and method of operating same according to the invention are described below with reference to the accompanying drawing which is a diagrammatic cross-section of a fluidised bed combustor.

Referring to the sole drawing a fluidised bed combustor 1 comprises a horizontal elongate cylindrical body 2 in the lower part of which is situated a gas permeable distributor plate 4. A plenum 6 is defined beneath the plate 4 and is divided into two parts 7, 9 longitudinally of the body 2 with associated air or gas inlets 3, 5 respectively. A hollow elongate baffle 8 is arranged longitudinally within the body 2 and extends from a position in the freeboard 10 downwardly into a fluidised bed 12 particulate material to divide the bed into a larger region 14 and a relatively smaller region 15. The baffle 8 at its lower extremity defines a material flow path 16 between it and the plate 4 and at its upper extremity, formed by a deflector 17, defines a gas and entrained solids passage 18 between the deflector and the cylindrical wall of the body 2.

The deflector 17 formed at the upper extremity of the baffle 8 is secured to the lower part 19 thereof which has water cooling passages 23 An inlet 20 is defined in the baffle 8 and the baffle communicates with an exhaust outlet 21 provided at one end of the body 2.

A heat exchanger diagrammatically shown at 22 is provided within the body 2 such that in use it is at least partly immersed in the expanded fluidised bed.

In operation, the bed 12 is formed in the combustor body 2 on plate 4 and has a slumped level indicated by the chain link line 30. Fluidising air is passed into the two parts of the plenum 6, the velocity of air in part 9 being at a level just sufficient to maintain fluidisation and that of air in part 7 being at a level to cause fluidisation of greater intensity in the region 14 of the bed 12. Fuel in solid liquid or gaseous form is introduced into the region 14 and at least partly burnt therein. Combustion gases (shown by a broken line arrow) leave the surface 32 of the fluidised bed in region 14 and pass into the freeboard 10 and because of the vigorous nature of the fluidisation mechanism carry with them entrained particles (shown by a solid line arrow) of bed material and of unburnt solid fuel, where this type of fuel is used. The mixture of gases and particles pass upwardly sweeping the wall of the body 2 and one side of the baffle 8 to enter the passage 18 wherein they sweep a further part of the combustor body wall. At the end of this passage a substantial proportion of the particles precipitate out and are deposited in region 15 of the bed 12, the gases passing into the hollow baffle 8 through inlet 20, whence the gases flow to the end of the body 2 for discharge. In practice, the combustor body 2 forms a furnace tube of a horizontal shell boiler 40 and the exhaust gases flow through one or more passes of smoke tube prior to their egress from the boiler.

The particles deposited in the smaller region 15 are less likely to elutriate because of the lower fluidising velocity in that region. The build up of solids in region 15 causes a downward movement resulting in a circulation of particles from region 15 to region 14. Thus any unburnt solids carried out of region 14 find their way into region 15 for subsequent burning there or in region 14 after recirculation which takes place via flow path 16. The region 15 therefore constitutes a burn-up cell for particulate fuel, thereby increasing overall combustion efficiency and reducing the solids loading of the exhaust gases and thus the gas cleaning equipment.

In the configuration of combustor described it will be appreciated that heat transfer takes place not only when the bed 12 is in contact with the body wall but substantially over the whole of the body wall above plate 4, that is through direct contact with the bed, through particle splash in the freeboard 10, through contact with the water cooled baffle 8, and via the heat exchanger 22.

It will be understood that whilst the specific embodiment is provided with two regions in the fluidised bed, multi-cell configurations of high and low velocity bed regions are within the scope of the invention.

The present invention thus provides for horizontal shell boilers a means of reducing elutriation and at the same time, of enhancing combustion efficiency and heat transfer.

We claim:

1. A fluidized bed combustor including a horizontally elongate cylindrical body adapted to contain a fluidized bed of particulate material, a gas permeable support on which in use the bed is supported within the body, a plenum defined between the support and the base of the body, the plenum being divided into at least two parts, an exhaust outlet means at one end of the body, and a hollow elongate baffle extending within the body longitudinally thereof, the interior of the baffle communicating with the exhaust outlet means, a deflector located at a relatively upper part of the baffle and spaced from the defining wall of the body to provide passage means for the flow in use of gas and entrained bed particles from one side of the baffle to the other side thereof, an inlet means provided in the baffle at said relatively upper part adjacent a trailing portion of the deflector, the baffle being disposed within the body such that in use at least a lower part thereof extends into the bed of particulate material thereby to define at least two regions therein corresponding to the at least two parts of the plenum and the upper part thereof extends into the freeboard above the bed.

2. A fluidised bed combustor according to claim 1 in which the hollow elongate baffle is provided with cooling passage means at least in the lower part thereof.

3. A fluidised bed combustor according to claim 1 in which a heat exchanger is located within the body.

4. A fluidised bed combustor according to claim 1 in which one region defined by the baffle is larger than the other region.

5. A method of operating a fluidized bed combustor comprising the steps of establishing a bed of particulate material in at least two regions of a hollow elongate baffle at least a lower part of which extends into the bed and an upper part thereof extends into the freeboard above the bed, fluidizing the regions of the bed at different rates, causing gases and entrained bed particles to pass in the freeboard from one region of the bed around the baffle through passage means defined between a deflector located at a relatively upper part of the baffle and the defining wall of the body to the other region thereof, the gases passing into the baffle through inlet means adjacent a trailing portion of the deflector, the gases exhausting through an exhaust outlet means located at one end of the body and communicating with the interior of the baffle, the entrained bed particles being deposited in the other region of the bed fluidized at a relatively lower rate, and causing circulation of bed material between the regions of the bed.

6. A method according to claim 5 in which the fluidised bed is divided into a relatively larger region and a relatively smaller region.

7. A method according to claim 6 in which fluidising gas is passed at a rate just sufficient to cause fluidisation of the bed material in the relatively smaller region.

8. A method according to claim 7 in which fluidising gas is passed into the relatively larger region at a higher rate than that for the relatively smaller region.

9. A method according to claim 8 in which elutriated particles of the bed material are caused to pass from the relatively larger region of the bed around the baffle and are deposited in the relatively smaller region.

10. A method according to claim 6 in which bed material is caused to circulate under the baffle from the relatively smaller region to the relatively larger region of the bed.

* * * * *